United States Patent [19]

Haegele

[11] 4,187,736

[45] Feb. 12, 1980

[54] RACK STEERING

[75] Inventor: Gerhard Haegele, Hohenstadt, Fed. Rep. of Germany

[73] Assignee: Zahnradfabrik Friedrichshafen AG, Friedrichshafen, Fed. Rep. of Germany

[21] Appl. No.: 932,640

[22] Filed: Aug. 10, 1978

[30] Foreign Application Priority Data

Aug. 13, 1977 [DE] Fed. Rep. of Germany ....... 2736631

[51] Int. Cl.² ............................................. B62D 1/20
[52] U.S. Cl. ....................................... 74/422; 74/470; 74/498
[58] Field of Search ................. 74/422, 470, 490, 498, 74/89.17

[56] References Cited

U.S. PATENT DOCUMENTS

| 3,593,593 | 7/1971 | Bradshaw | 74/422 |
| 3,745,850 | 7/1973 | Bayle | 74/422 |

*Primary Examiner*—C. J. Husar
*Assistant Examiner*—Conrad Berman
*Attorney, Agent, or Firm*—Zalkind & Shuster

[57] ABSTRACT

Rack steering gear is provided wherein the rack is slidable between cushioning devices on a guide member reciprocated through the cushioning devices and which connects to the steering linkage mechanism for actuation thereof. Road shock is absorbed by the cushioning devices so as not to be transmitted to the rack and thus to the primary steering system comprising the steering wheel and the steering shaft which conventionally actuates the rack through a pinion. The cushioning devices are constructed so that minor shocks are quickly absorbed to preclude vibration and chattering.

10 Claims, 3 Drawing Figures

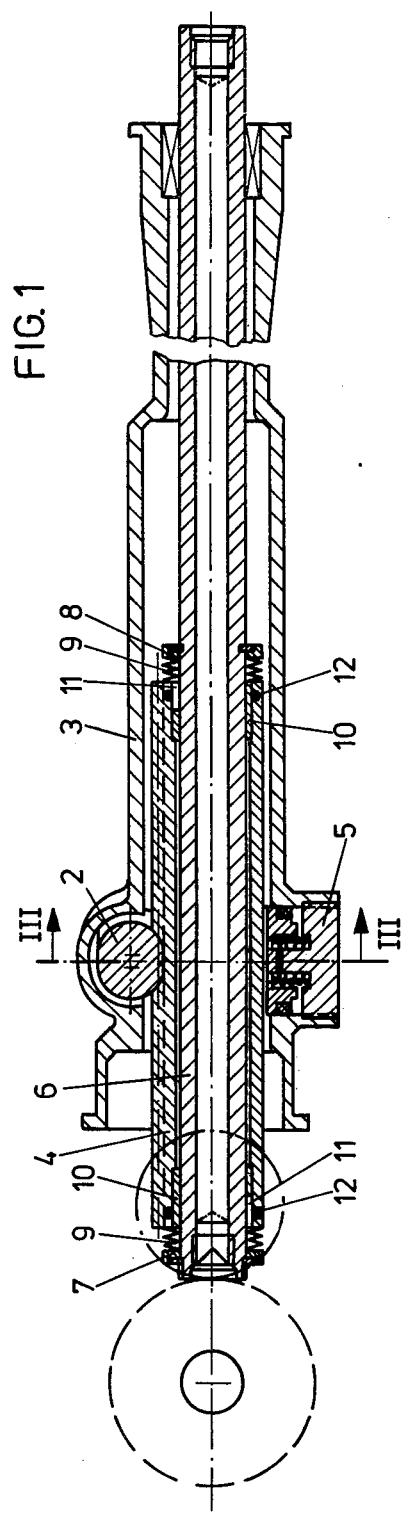
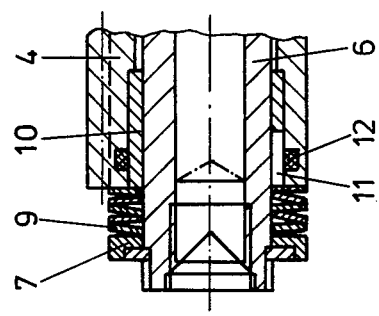
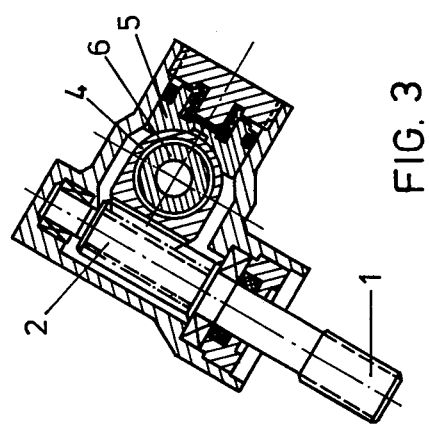
FIG. 1
FIG. 2
FIG. 3

RACK STEERING

The invention relates to gear rack steering devices wherein a steering shaft having a pinion reciprocates a gear rack articulated to steering mechanism linkages which actuate vehicle wheels. The steering shaft is, of course, rotated manually by a steering wheel which mechanisms are subject to road shock due to roughness of roadways, potholes, bumps and the like and such shocks are transmitted from the wheels through the rack and pinion connection to the primary portion of the steering system meaning the steering shaft and steering wheel. Such impacts are particularly objectionable in frequencies of 10-20 Hz.

In the prior art such impacts were cushioned by cushioning devices or shock absorbers disposed between the rack and the connection to the steering linkages. While that expedient eliminates hard impact and rough thrust, the moment of inertia of the arrangement is too great to cushion against relatively weak shock or impacts.

The present invention has, for its purpose, a simple arrangement that will absorb large and small impacts by isolating the primary side of the steering system through a floating connection between the rack and the steering mechanism linkages.

In brief, the invention utilizes a rack and pinion arrangement wherein the rack rides slidably on a guide bar and is connected to the guide bar via cushioning devices at each end of the rack which are secured to the guide bar. The guide bar is articulated to the steering linkage mechanism and is thus reciprocated through cushioning devices by the gear rack but wherein reverse forces of rough roads are absorbed.

Accordingly, an impact or shock transmitted by the wheels through the steering linkage mechanism to the guide bar is absorbed in one or the other cushioning devices instead of arriving as a heavy impact on the gear rack. This precludes transmitting shock to the primary steering system. A particularly novel aspect of the invention is the fact that sudden and short shocks act on the guide bar alone rather than being transmitted to the gear rack.

The gear rack is tubular and coaxially encompasses the guide bar with the cushioning devices being back-to-back dished springs. Thus, there is a set of such springs at each end of the gear rack and at least one spring in each set is more resilient than the others to readily absorb weak impact. Accordingly, weak vibrations or shocks within a large range are absorbed by the arrangement of a combination of weak and strong springs, as well as heavy shock. Some leeway in the type of springs used, is, of course, feasible such as flexible rings of rubber or plastics and for that matter all of the springs can be of equal resilience, although sacrificing variable strength and thus not having the advantage of response to weak shocks or vibratory effects.

In arrangement, the gear rack is slidable on the guide bar with intermediate split plastic bushings, which serve as bearings and which take up play between the two members. The gear rack carries O-rings which squeeze the bushings effecting a contraction to take up play. The minimum play arrangement of the plastic bushings in combination with the O-rings further reduces chattering that could be transmitted to the primary steering elements. The pinion on the steering shaft is maintained in engagement with the gear rack by a pressure pad device known per se.

A detailed description of the invention now follows in which:

FIG. 1 is in longitudinal section through the gear rack and guide bar showing essential features.

FIG. 2 is an enlargement of the portion indicated in dash-dot lines of FIG. 1; and FIG. 3 is a section on the line III—III of FIG. 1.

Referring to the drawing, a steering shaft 1 is illustrated which will be understood to connect through a steering column to a steering wheel (not shown) and wherein the shaft is fashioned with the usual pinion 2 in mesh with the teeth of a gear rack 4 within housing 3. Gear rack 4 is maintained in pressure engagement with pinion 2 and guided by pressure pad means 5, a well known arrangement in rack and pinion steering.

Gear rack 4 is tubular and slidably carried on a guide bar 6 coaxially therewith wherein guide bar 6 may be connected at both ends in any conventional manner with steering linkages of a vehicle, as symbolically indicated in the dashed circle at the extreme left of FIG. 1. Carried fixedly on guide bar 6 are abutment washers 7 and 8 and sets of dished springs 9 which encompass the guide bar at respective ends of gear rack 4 and engage therewith. Accordingly, the gear rack is flexibly slidable on the guide bar within the limits imposed.

The gear rack 4 has internal split plastic bushings 10 at respective ends as shown. The splits in bushings 11 are about mid-way longitudinally of the bushings. Surrounding each bushing and carried by the gear rack is an O-ring 12 proximate the split of each bushing and effecting a circumferential contraction so that a close and smooth sliding minimum play coaction between gear rack and guide bar is effected. The bushings are locked intermediate radial shoulders of the gear rack, as shown, and the dished spring sets. The arrangement of bushings and O-rings thus serve as slide bearings as well as a take up for any play that may otherwise be occasioned between the gear rack and the guide bar.

From the above arrangement it will be apparent that road shock transmitted through the vehicle wheels to either end of the guide bar 6 will be cushioned in the spring sets 9 so that no shock impact can reach the gear rack to find its way to the steering wheel. Further, due to the fact that at least one of the dished springs is more resilient than the others in each set there will occur an absorption of mild shock and vibration coming from the vehicle wheels in their travel on a roadway.

I claim:

1. In a gear rack steering device comprising a steering shaft having a pinion and a gear rack engaged thereby, the improvement which comprises a guide bar with said gear rack being slidably carried thereon;

shock cushioning means carried by said guide bar and secured thereto and engaging respective ends of said gear rack;

said guide bar being adapted for connection to a steering linkage mechanism and reciprocated through said cushioning means by said gear rack to effect steering by operation of said steering shaft;

wherein road shock transmitted from a steering linkage mechanism to said guide bar is absorbed by said cushioning devices.

2. In a steering device as set forth in claim 1, said guide bar being tubular and coaxially encompassed by said gear rack.

3. In a steering device as set forth in claims 1 or 2, including split bushing means intermediate said gear rack and said guide bar movable with said gear rack and O-rings carried by said gear rack engaging said bushing means to circumferentially contract said bushing means.

4. In a steering device as set forth in claims 1 or 2, including a housing supporting an end of said guide bar and pressure pad means carried by said housing and engaging said guide bar to maintain steering shaft pinion and gear rack engagement and guidance for said guide bar.

5. In a steering device as set forth in claim 1 or 2, said cushioning means at each end of said gear rack comprising flexible dished springs.

6. In a steering device as set forth in claim 5, said dished springs being in sets at each end of said gear rack and at least one of said springs in each set being more resilient than the others to absorb minor shock and vibration.

7. In a steering device as set forth in claim 5, including split bushing means intermediate said gear rack and said guide bar movable with said gear rack and O-rings carried by said gear rack engaging said bushing means to circumferentially contract said bushing means.

8. In a steering device as set forth in claim 5, said dished springs being in sets at each end of said gear rack and at least one of said springs in each set being more resilient than the others to absorb minor shock and vibration.

9. In a steering device as set forth in claim 5, including a housing supporting an end of said guide bar and pressure pad means carried by said housing and engaging said guide bar to maintain steering shaft pinion and gear rack engagement and guidance for said guide bar.

10. In a steering device as set forth in claim 5, said dished springs being in sets at each end of said gear rack and at least one of said springs in each set being more resilient than the others to absorb minor shock and vibration, and including split bushing means intermediate said gear rack and said guide bar movable with said gear rack and O-rings carried by said gear rack engaging said bushing means to circumferentially contract said bushing means, and including a housing supporting an end of said guide bar and pressure pad means carried by said housing and engaging said guide bar to maintain steering shaft pinion and gear rack engagement and guidance for said guide bar.

* * * * *